March 11, 1952     A. L. OBERBECK ET AL     2,589,117
FISH LURE
Filed March 4, 1947
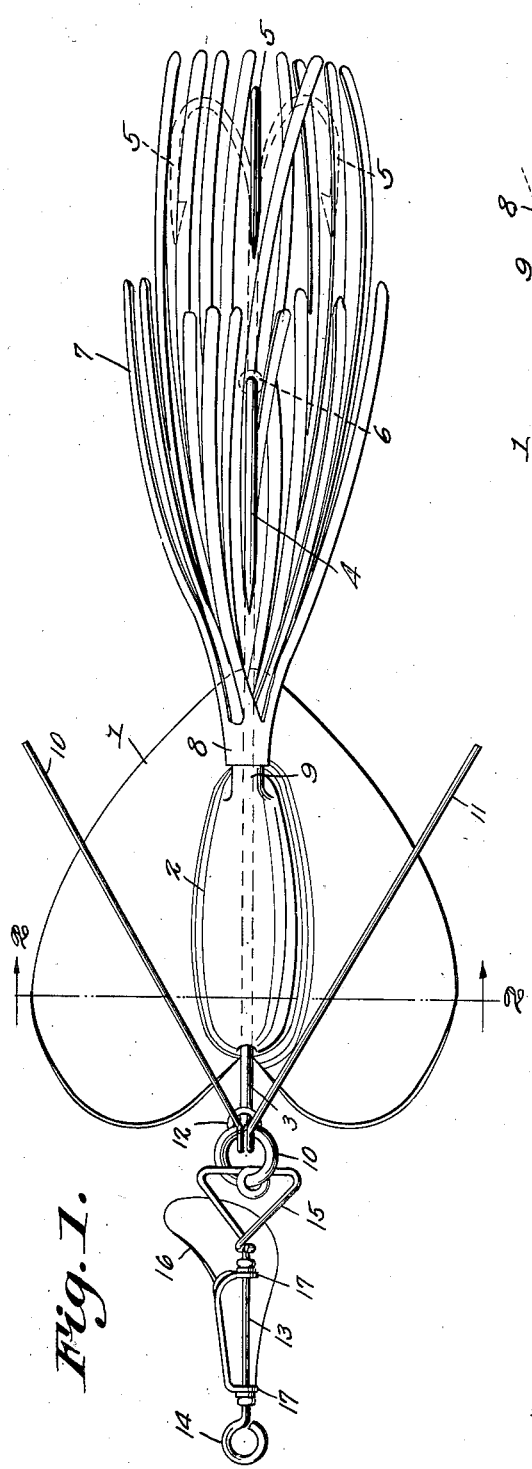
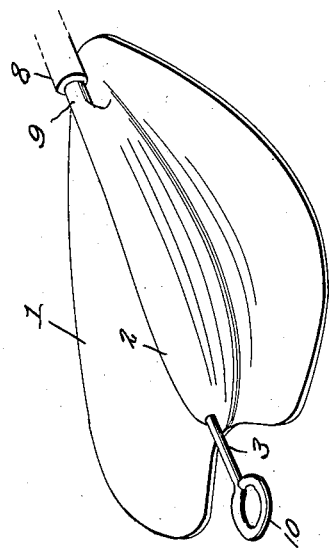
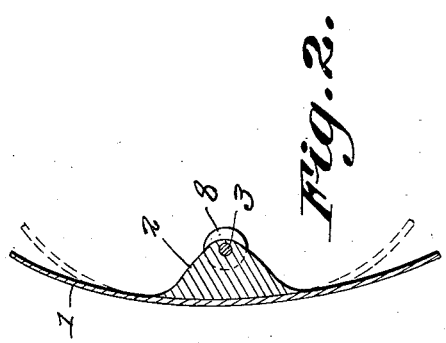
A.L.Oberbeck
D.V.Mason
Inventors.
By Abnow&Co.
Attorneys.

Patented Mar. 11, 1952

2,589,117

UNITED STATES PATENT OFFICE 2,589,117

FISH LURE

August L. Oberbeck and Darrell V. Mason,
Jefferson City, Mo.

Application March 4, 1947, Serial No. 732,174

1 Claim. (Cl. 43—42.28)

The present invention relates generally to the class of implements employed in fishing and casting, and more specifically to an improved adjustable master plug, artificial bait, or fish lure, which, while adapted for various kinds of fishing, is especially designed for bass fishing, fishing for other game fish, and in waters where weeds and other undergrowth are likely to be encountered.

The primary object of the invention is the provision of a fish lure that may readily be adapted or adjusted to the depth of streams, to fast operating of the fish reel as well as slow operations of the reel; and further to provide a lure and its equipment consisting of a minimum number of parts that may with facility be manufactured at low cost of production, the parts assembled conveniently, and the resulting lure is simple in construction as well as efficient and smooth running.

The invention consists in certain novel features of construction involving a flexible and adjustable lure, and combinations and arrangements of parts of the lure equipment as will hereinafter be described and more specifically set forth in the appended claim.

In the accompanying drawing we have illustrated a complete example of a physical embodiment of our invention wherein the parts are combined and arranged in accord with one mode we have devised for the practical application of the principles of the invention.

It will, however, be understood that changes and alterations are contemplated and may be made in these exemplifying drawings and mechanical structures, within the scope of our claim without departing from the principles of the invention.

Figure 1 is a plan view of the equipment forming the lure or artificial bait of our invention.

Figure 2 is a transverse vertical sectional view through the adjustable lure, as at line 2—2 of Fig. 1; and Figure 3 is a perspective view of the lure detached from the remaining equipment.

In carrying out our invention we employ an adjustable lure 1 fashioned in generally heart-shape from pliant, pliable, or flexible metal or other suitable material to provide a concavo-convex structure that is capable of being bent to an adjusted position, transversely as indicated by dotted lines in Fig. 2. The lure may also be manually bent or flexed at its front end by curling inwardly, or outwardly, the front wings that perform the functions of rudders for the lure. For speed in drawing the lure through the water the wings are bent outwardly in order to present a small area for resistance; and for slower speed the wings may be curled inwardly to present a wider area of resistance.

For attachment of the artificial bait parts to the lure, the latter is provided with a longitudinally extending central lobe 2 that may be welded to its inner concave face, and a draw rod or pin 3 is rigidly embedded within the lobe. The pin 3 projects from the rear end of the lure and a large master hook 4 is formed integral with the pin, while a triple hook or grappling hook 5, 5, 5, is pivotally mounted upon the master hook, as indicated at 6.

The several hooks are partially enclosed within a fibrous tail, or weed guard 7 of suitable material that simulates the tail of a smaller fish, and the tail is firmly attached by its front collar 8 to a boss 9 at the rear end of the lobe of the lure.

At its front end the pin projects from the lure and is fashioned with an attaching eye 10, to which a V-shaped wire or weed guard 11 is coupled at 12.

A towing link 13 having a front eye 14 for attachment to the fish-line, is provided at its rear end with a triangular yoke 15 that is loosely pivoted on the front eye of the lure; and a spinner 16 is provided with swivel bearings 17, 17 on the link 13.

The concavo-convex blade of pliant and tough material may be skillfully and manually reshaped with precision and accuracy to form a symmetrical lure in adapting the lure to different conditions in the fishing waters. When casting in shallow waters, or in waters having a growth of weeds the lure may be shaped to insure a selected speed that controls the depth of the artificial bait; and in speedy operation of the reel, a puttering noise is developed by the artificial bait as an added attraction for the game fish. With the same adjustment of the lure, slow operation of the reel will permit a deeper running of the artificial bait.

Having thus fully described our invention, what we claim as new and desire to secure by Letters Patent is:

In an artificial bait, a body portion including a concavo-convex metal plate, a longitudinally extended central lobe rigidly secured to the body portion and arranged on the concaved side of the body portion with the ends thereof terminating adjacent to the ends of the body portion, a boss extending from one end of the lobe, a fibrous tail section including a collar secured over the boss, a plurality of hooks secured to the body portion and concealed within the fibrous tail section, a draw pin extending throughout the length of the lobe with the ends thereof extended beyond the ends of the lobe, and a line attaching eye at the front end of the pin.

AUGUST L. OBERBECK.
DARRELL V. MASON.

REFERENCES CITED

The following references are of record in the file of this patent:

UNITED STATES PATENTS

| Number | Name | Date |
|---|---|---|
| 1,566,812 | Bayer | Dec. 22, 1925 |
| 1,573,288 | Wilson | Feb. 16, 1926 |
| 1,804,391 | Abrahams | May 12, 1931 |
| 2,180,918 | Verzi | Nov. 21, 1939 |
| 2,184,330 | Arbogast | Dec. 26, 1940 |
| 2,294,971 | Fehringer | Sept. 8, 1942 |
| 2,319,026 | Adams | May 11, 1943 |

FOREIGN PATENTS

| Number | Country | Date |
|---|---|---|
| 111,724 | Sweden | July 6, 1944 |
| 748,370 | France | Apr. 10, 1933 |